Nov. 10, 1931.          C. M. HAGEN ET AL            1,831,659
                          FRUIT JAR HOLDER
                        Filed Nov. 7, 1930          2 Sheets-Sheet 1
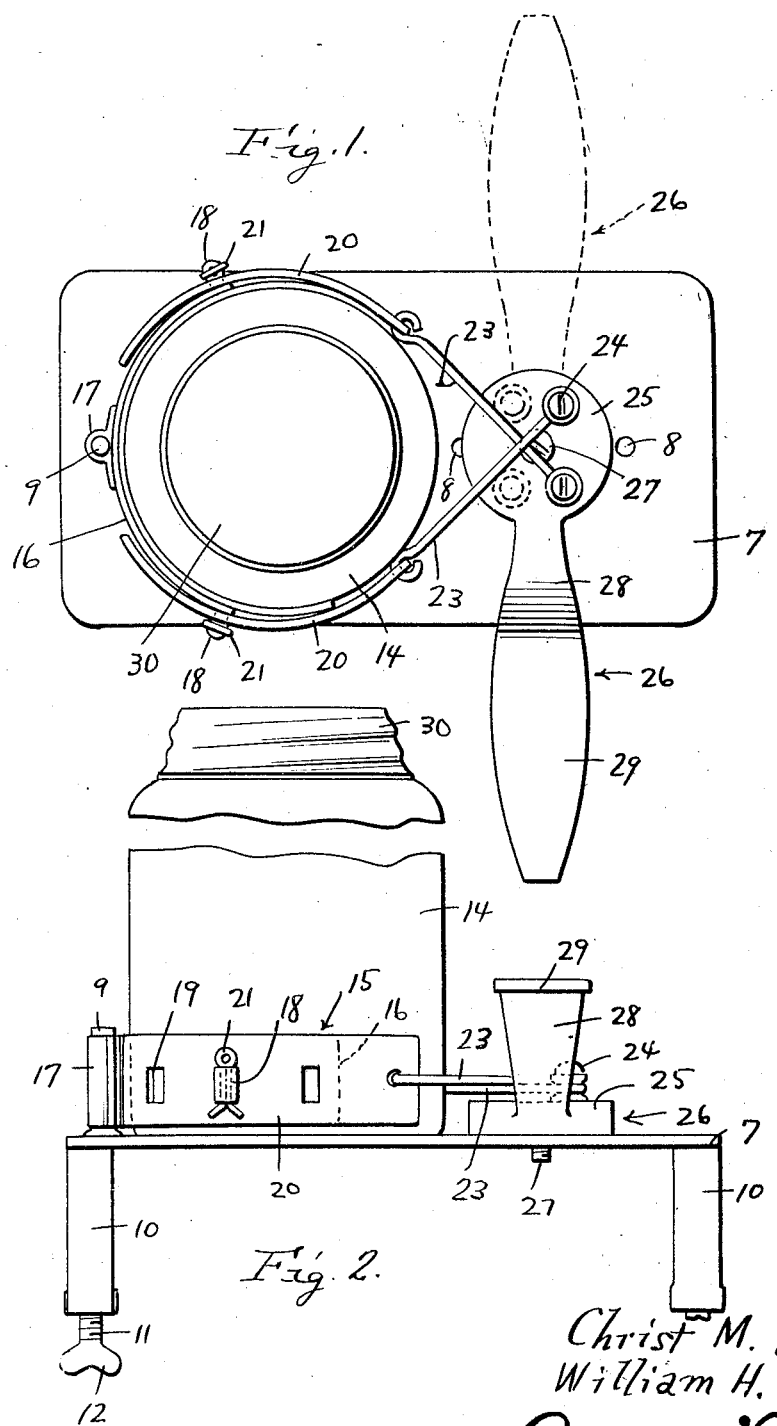
Inventors
Christ M. Hagen
William H. Prestidge
By Clarence A. O'Brien
                        Attorney

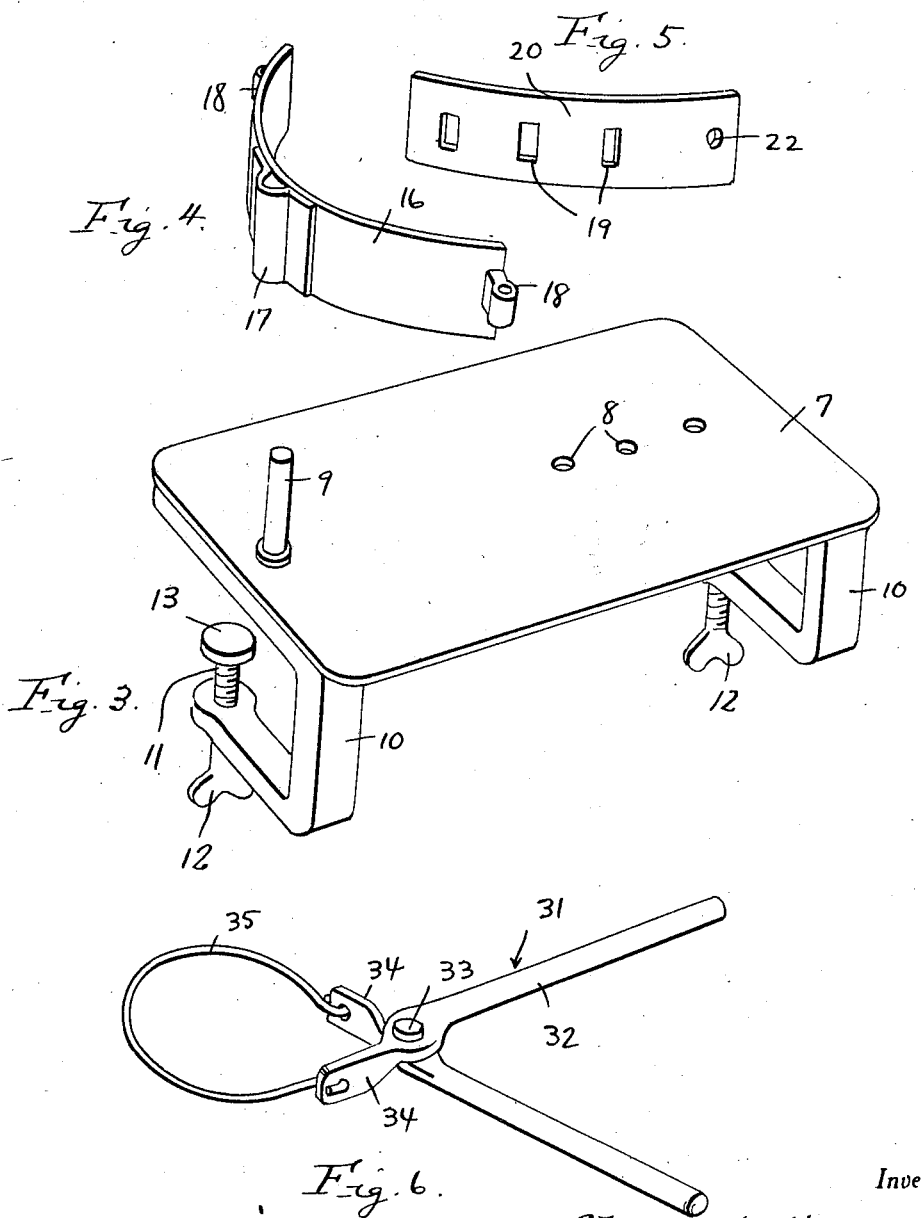

Patented Nov. 10, 1931

1,831,659

UNITED STATES PATENT OFFICE

CHRIST M. HAGEN AND WILLIAM H. PRESTIDGE, OF BELGRADE, MINNESOTA

FRUIT JAR HOLDER

Application filed November 7, 1930. Serial No. 494,124.

This invention relates to a household or kitchen appliance in the nature of a holder or retainer for securely gripping and holding a fruit jar steady to aid in removing and replacing the conventional screw cap.

Briefly stated, the invention comprehends a structure which embodies two individual tools, namely, a screw cap implement to facilitate application and removal of the cap, and a fruit jar holder.

In carrying the inventive conception into practice, we have evolved and produced a simple and economical arrangement of details which have been expressly selected and organized to fulfill the requirements of a structure of this class in a dependable and satisfactory manner.

Other features and advantages will become more readily apparent in the following description and drawings.

In the accompanying drawings, in which like numerals are employed to designate like parts throughout the same:

Figure 1 is a top plan view of the jar holder.

Figure 2 is a side elevational view thereof.

Figure 3 is a perspective view of the bracket equipped jar supporting base.

Figure 4 is a perspective view of one of the details of the jar embracing clamp.

Figure 5 is a perspective view of a companion part of said clamp.

Figure 6 is a perspective view of the screw-cap applying and removing tool.

As seen in Figure 3, the numeral 7 designates a substantially rectangular base plate having a plurality of longitudinally spaced alined holes 8 adjacent one end. At the opposite end is an upstanding post or spindle 9. On the bottom are U-shaped table brackets 10, the lower arm of which is provided with a retaining set screw 11 having a finger grip 12 and a table engaging head 13.

In Figures 1 and 2, the fruit jar is indicated by the numeral 14 and this is seated on the base plate within the vicinity of the post. Associated with this post is the multiple part jar embracing clamp 15. This comprises an arcuate main section 16 having an intermediate pivot clip 17 fitted around the post 9. At its opposite ends, this part 16 is provided with apertured lugs 18.

These lugs are designed to be selectively arranged in the square holes 19 formed at longitudinally spaced points in the adjustable supplementary sections 20 of the clamp. Incidently, cotter keys 21 are employed to hold the sections 20 in adjusted position on the companion section 16.

The free ends of the sections 20 are provided with apertures 22 to accommodate the adjusting and clamping links 23. These links are disposed in intersecting relationship and pivotally secured by eccentrically located fastenings 24 on the marginal portion of the disc-like head 25 of the actuating or adjusting lever 26. This lever includes a centralized pivot 27 which may be selectively positioned in one of the holes 8.

Then there is a handle including an upstanding portion 28 and a horizontal portion 29 forming a suitable hand-grip. By placing the arcuate sections 20 on the lugs 18 of the main section 16, the clamp is ready to embrace and tightly hold the jar 14. By moving the handle 29 from the dotted line position shown in Figure 3 around through a half circle to the position shown in full lines in Figure 1, the links 23 are drawn into intersecting relationship so as to bind the sections of the clamp around the jar to securely hold the jar on the base while applying or removing the screw cap 30.

A special tool 31 is provided to aid in applying and removing the cap, and this comprises a pair of complemental levers 32 pivotally connected together into intersecting relationship as at 33 in Figure 6 and the free end portions are provided with flattened extensions 34 to accommodate the free end portions of the spring wire loop 35. The tension of this wire is such as to normally maintain the levers 32 spread apart.

By slipping the loop around the top 30 and pressing the levers 32 together, a binding or clamping action is produced whereby to facilitate removal or application of the cap. It is understood in this connection that when the jar is secured on the base plate by adjusting the lever 26 as seen in Figure 1, the jar is held securely and the lever stays put.

In this connection, it will be observed that the companion sections of the clamp 15 are of spring metal so as to facilitate opening and closing of the clamp. Hence the jar clamp may be made up of adjustably connected embracing sections, and an operating device comprising the link 23 and the adjusting and retaining lever assembly 26.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

We claim:

1. In a jar holder of the class described, a jar supporting base plate, retaining brackets carried by said plate, said plate being provided at one end with longitudinally spaced pivot bolt receiving holes and provided at the opposite end with an upstanding journal post, a sectional jar clamp mounted on said post and including contracting and expanding links, a lever including an offset handle and a disc-like head, said head being provided with a centralized pivot bolt for selective reception in the aforesaid bolt holes, and pivotal attaching elements securing the free end portions of said links eccentrically to the head portion of said lever.

2. In a jar holder of the class described, a base plate having attaching brackets and provided with an upstanding journal post, a jar clamp comprising a main arcuate section having a clip pivotally mounted on said post and provided at its opposite ends with outstanding apertured lugs, a pair of duplicate companion sections of arcuate formation provided with longitudinally spaced holes for selective engagement with the adjacent lugs, links attached to the free end portions of said second-named sections, and a pivotally mounted operating lever on said base plate, said links being pivotally connected with the actuating portion of said lever.

3. A fruit jar holder of the class described comprising a substantially rectangular base plate provided at one end with longitudinally spaced bolt holes and provided at the opposite end with an upstanding journal post, U-shaped retaining brackets on the underside of said plate including set screws, a jar embracing clamp comprising a main arcuate section provided intermediate its ends with a pivot clip rockably mounted on said post, said section being provided at its opposite ends with outstanding apertured lugs, a pair of secondary companion clamp sections provided with longitudinally spaced holes selectively engageable with said lugs, removable cotter keys associated with the lugs for maintaining the companion sections in assembled relationship, expanding and contracting links connected to the free end portions of said second-named sections, an operating lever having a disc-like head and an operating handle, said head being centrally and adjustably pivoted on said plate through the medium of a bolt and said bolt holes, and removable fasteners pivotally connecting the free end portions of the links with said head.

In testimony whereof we affix our signatures.

CHRIST M. HAGEN.
WILLIAM H. PRESTIDGE.